(12) United States Patent
Grossmann (10) Patent No.: US 9,222,503 B2
(45) Date of Patent: Dec. 29, 2015

(54) SUPPORT SYSTEM FOR A SUPPORT RAIL

(71) Applicant: Christian Grossmann, Detmold (DE)

(72) Inventor: Christian Grossmann, Detmold (DE)

(73) Assignee: PHOENIX CONTACT GMBH & CO. KG, Blomberg (DE)

( * ) Notice: Subject to any disclaimer, the term of this patent is extended or adjusted under 35 U.S.C. 154(b) by 0 days.

(21) Appl. No.: 14/352,321

(22) PCT Filed: Oct. 19, 2012

(86) PCT No.: PCT/EP2012/004387
§ 371 (c)(1),
(2) Date: Apr. 17, 2014

(87) PCT Pub. No.: WO2013/056850
PCT Pub. Date: Apr. 25, 2013

(65) Prior Publication Data
US 2014/0299732 A1    Oct. 9, 2014

(30) Foreign Application Priority Data
Oct. 21, 2011    (DE) .......................... 10 2011 054 725

(51) Int. Cl.
*F16B 41/00* (2006.01)
*H02B 1/052* (2006.01)

(52) U.S. Cl.
CPC .............. *F16B 41/002* (2013.01); *H02B 1/052* (2013.01); *Y10T 29/49947* (2015.01)

(58) Field of Classification Search
CPC .. H02B 1/052; F16B 41/002; Y10T 29/49809
USPC ........... 248/500, 220.21, 226.1, 227.1, 228.1, 248/231.85; 403/408.1; 439/709, 723; 361/600, 601, 605
See application file for complete search history.

(56) References Cited

U.S. PATENT DOCUMENTS

| 4,857,670 | A  | * | 8/1989  | Frank et al. | 174/68.3 |
|-----------|----|---|---------|--------------|----------|
| 5,392,196 | A  | * | 2/1995  | Kinner | 361/809 |
| 5,480,310 | A  | * | 1/1996  | Baum | 439/94 |
| 5,907,476 | A  | * | 5/1999  | Davidsz | 361/732 |
| 7,011,551 | B2 | * | 3/2006  | Johansen et al. | 439/709 |
| 7,304,240 | B1 | * | 12/2007 | Gretz | 174/72 A |

FOREIGN PATENT DOCUMENTS

| AT | 000237 U1 | 5/1995 |
| DE | 4005138 A1 | 10/1990 |
| DE | 4438525 A1 | 5/1996 |
| DE | 19512840 A1 | 10/1996 |
| EP | 1816715 A1 | 8/2007 |
| EP | 2320531 A1 | 5/2011 |

\* cited by examiner

*Primary Examiner* — Anita M King
(74) *Attorney, Agent, or Firm* — Leydig, Voit & Mayer, Ltd.

(57) ABSTRACT

A support system for a support rail includes at least one clamping frame and at least one block-type fastening element. The at least one block-type fastening element is disposed on and fastened to a top surface of the support rail and is mounted in the at least one clamping frame.

11 Claims, 6 Drawing Sheets

SUPPORT SYSTEM FOR A SUPPORT RAIL

CROSS-REFERENCE TO RELATED APPLICATIONS

This application is a U.S. National Phase application under 35 U.S.C. §371 of International Application No. PCT/EP2012/004387, filed on Oct. 19, 2012, and claims benefit to German Patent Application No. DE 10 2011 054 725.8, filed on Oct. 21, 2011. The International Application was published in German on Apr. 25, 2013 as WO 2013/056850 A1 under PCT Article 21 (2).

FIELD

The invention relates to a support system for a support rail.

BACKGROUND

Problems frequently occur when transporting a support rail, mounting electrical components onto a support rail and/or finishing electrical components already arranged on the support rail, for example by attaching marker labels, before the support rail is positioned in a control cabinet. Semi-automatic or even fully automatic solutions are not standard or are not yet known. One reason for this is the extremely divergent contour of assembled support rails due to the very wide range of electrical components to be placed on them as well as a partly undefined shape of the support rails, which increases as the length increases. In particular, support rails are frequently bent or twisted. These properties prevent defined handling or guiding of the support rails whilst components are being mounted on them and thus an accurately reproducible and precise positioning and/or finishing of the electrical components on the support rail.

SUMMARY

In an embodiment, the present invention provides a support system for a support rail that comprises at least one clamping frame and at least one block-type fastening element. The at least one block-type fastening element is configured to be disposed on and fastened to a top surface of the support rail and is mounted in the at least one clamping frame.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

An aspect of the invention provides for the improvement of the handling of support rails. In particular, one aspect of the invention is to form the guiding mechanism of the support rail in a precise and accurately reproducible manner whilst the electrical components are being mounted on the support rail and/or the electrical components arranged on the support rail are being finished such that the mounting and/or finishing can be automated. Furthermore, it is an aspect of the invention to improve the fastening of a support rail inside a control cabinet.

In an embodiment, the invention provides using a support system for a support rail, comprising at least one clamping frame and at least one block-type fastening element, which is placed on a top surface of the support rail and is fastened thereto, the fastening element fastened to the support rail being mounted in the clamping frame.

The support system according to an embodiment of the invention facilitates the transportation of a support rail in that it is mounted in one or more clamping frames using one or more fastening elements. Furthermore, the support system facilitates the holding of the support rail while electrical components such as terminal blocks are being mounted on the support rail, and also while additional components such as bridges, connectors, wiring or markings are mounted onto the electrical components arranged on the support rail. Whilst electrical components are being mounted on a support rail, for example, the guiding mechanism of the support rail can be constructed in a precise and accurately reproducible manner by means of the support rail such that the mounting can be automated. For this purpose, the support rail is mounted in clamping frames using the fastening elements arranged on the support rail, each fastening element being mounted in a clamping frame. In the process, the fastening elements act as defined holding regions on which the support rail can be held in the support system. The fastening elements are placed on the top surface of the support rail, i.e. the side of the support rail on which the electrical components are also to be fastened, and connected to the support rail. Depending on the length of the support rail, both the number of fastening elements on the support rail and the number of clamping frames can be varied so that an automated mounting of components can take place irrespective of the length of the support rail. The support system can be used in diverse applications in the production of support rails with components mounted on them and in the construction of control cabinets. In order to achieve an improved construction of the control cabinets, in particular to improve the fastening of the support rail inside the control cabinet without producing splinters while the support rail is being mounted inside the control cabinet, the support system, which has a clamping frame mounted in each fastening element, can also be used inside a control cabinet. The support system then facilitates a non-cutting mounting of a support rail inside a control cabinet if the clamping frame or frames is/are arranged inside the control cabinet and the support rail can be mounted in the clamping frames using the one or more fastening elements arranged on the support rail. The mounting is preferably achieved only between the clamping frame and the fastening element. A direct fastening of the support rail to the clamping frame is preferably not necessary. In order to mount the fastening element, drilled holes, for example, can be formed on the fastening element, into which bolts, pins or screws formed on the clamping frame can be introduced. Furthermore, the fastening element can also be fastened to the clamping frame using clamping brackets and using locking arms, for example, which are formed on the fastening element or on the clamping frame.

The clamping frame is preferably substantially U-shaped and the clamping frame preferably grips around the fastening element mounted in the clamping frame underneath the support rail. Because the clamping frame grips around the fastening element underneath the support rail, the support system can be used irrespective of the height of the support rail and the electrical components arranged on the support rail. Moreover, the mounting of electrical components onto the support rail is not hindered by the clamping frames.

Furthermore, it is preferably provided for the clamping frame to be guided movably on a guide rail. By guiding the clamping frame on a guide rail, an assembled support rail can be handled without causing damage. For this purpose, the clamping frame is preferably arranged on a base element, which can engage in the guide rail by means of rollers or roller bearings, such that the clamping frame can be guided in the guide rail.

It is also preferably provided for the fastening element to have a base body, which can be fastened to the support rail, and a connecting element, the base body having a through-opening into which the connecting element is introduced, via which the block-type base body can be fastened to the support rail. The fastening element, together with the electrical components to be placed on the support rail, is placed onto the support rail from above and fastened to the support rail for example by means of a clamp or snap-in connection, before the support rail is fastened to the clamping frame or frames of the support system. By placing the fastening element onto the support rail from above, the fastening element can be fastened at any required points along the longitudinal axis of the support rail. Furthermore, because of the block-type design of the base body of the fastening element, the fastening element lines up with the electrical components placed on the support rail such that the electrical components can be fastened to the support rail directly adjacent to the fastening elements. 'Block-type' here means that the base body is not only constructed in the form of a thin plate but rather has a larger volume. Preferably, the block-type base body is constructed in the form of a thick plate, which is placed upright onto the support rail. Because the fastening element can be fastened to the support rail at the same time as the electrical components, free spaces no longer need to be provided between individual electrical components so that the space available on the support rail can be used more effectively. At the same time, the time and cost of assembly can be reduced. The base body of the fastening element is connected directly to the support rail, for example using a screw or clamp connection. In addition, the base body is connected to the support rail using the connecting element introduced into the base body. In the process, the connecting element is introduced into the base body vertically to the longitudinal axis of the support rail. The connecting element forms a detachable connection to the support rail and can, for example, be constructed in the form of a screw, a pin or a bolt. Furthermore, the fastening element according to the invention can also be formed such that it can also transmit electrical power or signals itself. For this purpose bridge shafts, for example, via which the electrical power or the signals can be passed or transmitted, can also be formed on the fastening element. Furthermore, the fastening element can also assume the function of an end bracket on a free end of the support rail. The fastening element here can have a labelling surface, using which a certain portion of the support rail with electrical components mounted thereon can be labelled. Since the fastening element forms a fixed connection with the support rail, the fastening element can also function as the contact of a PE conductor between the support rail and the mounting base. This means that that no contact points are lost to other PE terminals provided on the support rail. Furthermore, an illuminant, for example an LED lamp or an optical conductor, can also be arranged in the fastening element, via which the support rail can be directly illuminated, which is particularly advantageous in less well-lit control cabinets.

According to a preferred configuration of the fastening element, the connecting element is self-cutting. 'Self-cutting' here means that a feedthrough in the form of a drilled hole, through which the connecting element is fed, does not already have to be provided in the elements through which the connecting element is to be fed to form a fastening, for example on the support rail, before fastening, but rather the connecting element can bore through the element by means of a vertical movement downwards towards the corresponding element, for example the support rail, and can thus screw into it in that cutting edges are formed on the connecting element. For example, the connecting element can be formed here as a self-tapping screw, which is turned using a tool, in particular a screwdriver, which can be introduced into the through-opening into the base body from above. The total assembly time can be reduced because in this way, processing of the elements to be fastened, for example the support rail, beforehand by drilling openings is no longer necessary and thus the number of work steps can be reduced. Moreover, the flexibility of the fastening can also be increased as a result, since the fastening element can be positioned and fastened at any required point along the elements to be fastened, for example the support rail.

It is also preferably provided for the through-opening to have a shoulder formed as a locating surface for an upper part of the connecting element. The upper part of the connecting element can, for example, be a head, which has a larger diameter than the rest of the connecting element, which is preferably in the form of an elongated, round shaft. Due to the shoulder formed in the through-opening, by means of which a step is formed in the through-opening, the through-opening has two different diameters, the diameter of the through-opening being larger above the shoulder than below the shoulder. Because of the shoulder formed as a locating surface, the connecting element can be limited in its vertical movement in that the upper part of the connecting element comes to rest on the shoulder during a vertical movement of the connecting element towards the support rail. Moreover, the connecting element can thus be prevented from being fed too far through the support rail and thus projecting too far from the underneath of the support rail. Furthermore, the shoulder ensures that when the connecting element, the upper part of which is already resting on the shoulder formed as a locating surface, is tightened, an additional contact pressure towards the support rail can be applied.

In order to prevent the connecting element from being able to slip out of the through-opening, for example during transportation of the fastening element before mounting on a support rail, a retainer for the connecting element is preferably formed inside the through-opening. The retainer is formed in the through-opening above the upper part of the connecting element such that if a shoulder is also formed in the through-opening, the upper part of the connecting element is arranged between the retainer and the shoulder and is only movable between the retainer and the shoulder. The retainer is preferably formed by a narrowing of the diameter of the through-opening, which can for example be formed by a pin, a shoulder or a protrusion.

Another particularly preferred configuration of the fastening element provides for the fastening element to have an outer contour, which is adapted to an outer contour of an electrical component to be arranged on the support rail. The fastening element thus forms defined gripping surfaces, thereby facilitating automated handling, since the grippers of a robot, for example, can grip the support rail together with the electrical components placed thereon by means of the fastening elements and move it to the desired position, for example to a mounting base. The handling of a support base can thus be substantially simplified. Moreover, the appearance of an assembled support rail can be homogenised as a result of forming the fastening element with the same contour as the electrical components. The outer contour can, for example, be formed by a housing, which surrounds the base body such that the housing preferably forms the whole outer surface of the fastening element, the housing preferably being formed from a insulating material, such as a plastics material. It is, however, also possible for the outer contour of the fastening element to be formed by the base body itself. In addition to the adapted outer contour, reference patterns can also be provided on the fastening element for optical recognition using sensors or cameras.

According to another preferred configuration of the support system, the support system has a linear pivot system with a pivot device to pivot the support rail and a linear feed to guide the support rail in a linear manner. In addition to a purely linear guiding of the support rail in the support system, a pivoting movement of the support rail is facilitated by means of the pivot device of the linear pivot system thus making it easier to finish the electrical components arranged on the support rail, for example to arrange marking labels on the electrical components, since the electrical components arranged on the support rail and their outer surface to be finished can be pivoted and aligned by the rotating and pivoting movement of the support rail to an appropriate assembly device so that access by the assembly device to the outer surface of the electrical components to be finished can be substantially improved. The linear feed makes it possible for the support rail to be introduced or slid into the pivot device and also to be moved in a linear manner inside the pivot device.

The pivot device preferably has two turntables arranged opposite each other, between which the guide rail is arranged, the guide rail being connected to the two turntables. As a result of the two turntables, a virtual centre of rotation can be achieved during a pivoting movement of the support rail in the pivot device, the centre of rotation being formed in the longitudinal axis of the support rail or by the centres of the electrical components arranged on the support rail. By realising this virtual centre of rotation, the necessary torque can be reduced due to the short leverage ratios, and a tendency to tilt can also be prevented. The support rail is positioned on the guide element using the clamping frame or frames and can be moved along the guide element in a linear manner. The guide element is connected to the two turntables such that when the turntables are rotated, the guide element and thus also the support rail is rotated or pivoted therewith.

In order to execute the pivotal movement, the two turntables have a drive, the drive preferably comprising a synchronous shaft and a stepper motor drive. Because the drive for the turntables has a synchronous shaft and a stepper motor drive, the turntables, together with the receiving elements in which they are each retained, can pivot about any chosen angle. Moreover, the formation of torsions between the two turntables can be prevented.

The linear pivot system is preferably mounted on a linear guide axle. The linear guide axle facilitates a variable feed of the linear pivot system according to the width of the components arranged on the support rail, such as the electrical components and the fastening elements, such that the whole linear pivot system together with the support rail arranged therein can be moved incrementally to affix marking labels, for example, to the electrical components such that a specific guiding of the support rail for accurate finishing of every single electrical component can be achieved.

There is a plurality of options for configuring and developing the support system according to the invention.

Figure 1:
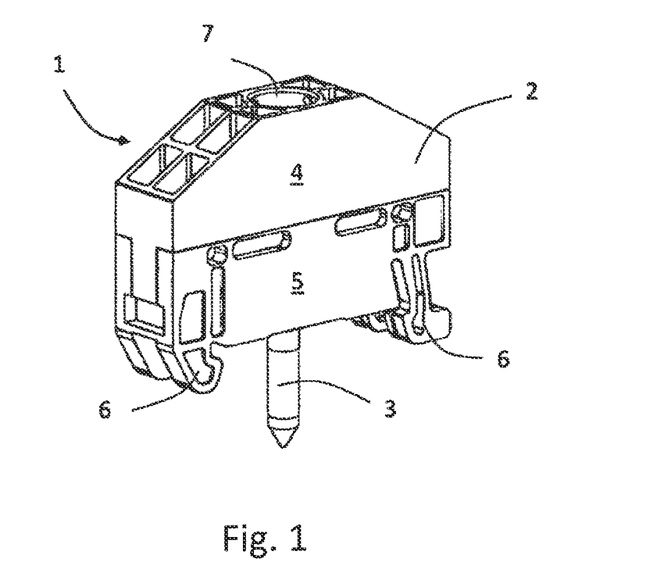
FIG. 1 shows a schematic view of a fastening element according to an embodiment of the invention.

In FIG. 1, a fastening element 1 to fasten a support rail in a support system or, for example, on a mounting base is shown, which has a block-type, disc-shaped base body 2, in which a connecting element 3 is introduced. The base body 2 here is formed of two parts, with an upper part 4 and a lower part 5, which are attached to each other and connected together. A mounting foot 6 is formed on the lower part 5, by means of which the base body 2 can be connected to a support rail, not shown here, in that the base body 2 is snapped or clamped onto the support rail by means of the mounting foot 6 in the same manner as the electrical components can also be snapped and clamped to the support rail.

Figure 7:
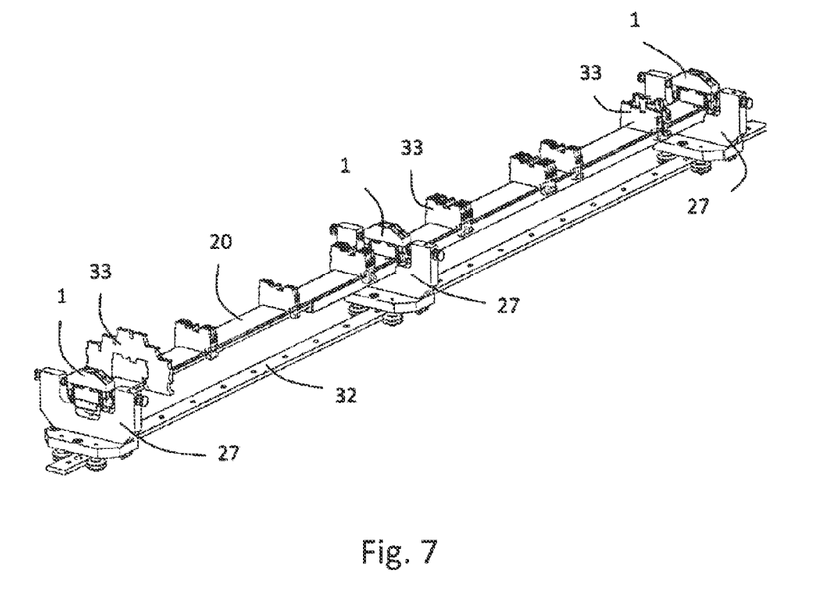
FIG. 7 shows a schematic view of a first embodiment of a support system according to an embodiment of the invention.

The outer contour of the base body 2 here corresponds substantially to the outer contour of an electrical modular terminal block, which can be placed on a support rail as an electrical component. The fastening element 1 can thus fit homogenously into a series of electrical components placed on a support rail, as shown in FIG. 7.

A through-opening 7 is formed in the base body 2 and extends beyond the upper part 4 and the lower part 5 of the base housing 2, in which the connecting element 3 is introduced. The through-opening 7 facilitates a vertical guiding of the connecting element 3 to the longitudinal axis of the support rail onto which the fastening element 1 is placed from above. A tool, with which the connecting element 3 can be turned, for example by means of a rotational movement, can be introduced into the through-opening 7 from above for this purpose. In the embodiment shown here, the connecting element 3 is in the form of a self-tapping screw, which cuts and screws itself into a support rail and a mounting base, which may be located underneath, by means of a rotational movement, as shown by way of example in FIG. 3.

Figure 2:
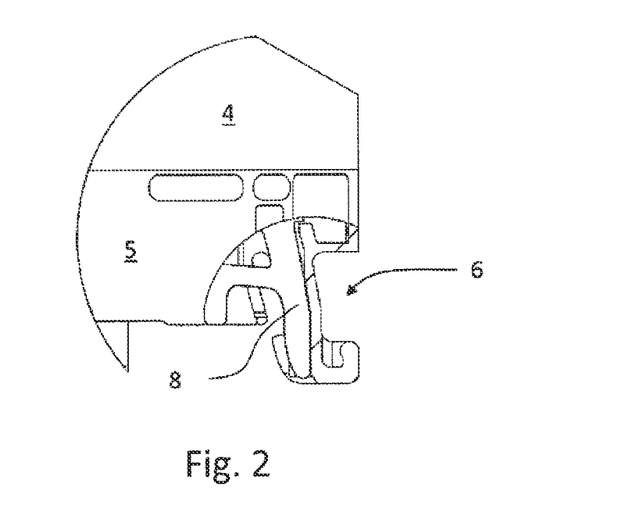
FIG. 2 shows a schematic view of a section of the fastening element shown in FIG. 1 in the region of a mounting foot in a partial sectional view.

In FIG. 2, a section of the mounting foot 6 of the fastening element 1 shown in FIG. 1 is shown. The mounting foot 6 shown here has a sheet metal spring 8 in the form of a bracket, by means of which a particularly secure clamped fastening of the fastening element 1 on a support rail can be achieved, such that a lateral displacement of the fastening element 1 on the support rail can be prevented.

Figure 3:
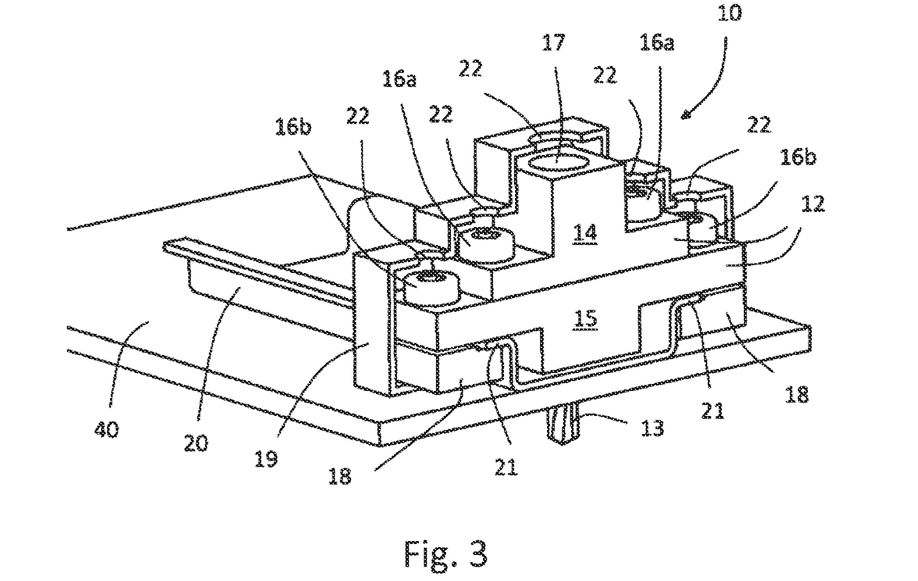
FIG. 3 shows a schematic view of a fastening element according to another embodiment of the invention.

FIG. 3 shows another possible embodiment of a fastening element 10 having a base body 12 formed of two parts, the upper part 14 and the lower part 15 of the fastening element 10 being connected to each other by means of screws 16a. The base body 12 is fastened to the support rail 20 using terminal blocks 18, which are also firmly connected to the base body 12 by means of screws 16b. The upper part 14 and the lower part 15 of the base body 12 here are each constructed in the form of a T-shaped block such that the whole base body 12 has a plurality of steps and is thus already adapted to the shape of an electrical modular terminal block. The terminal blocks 18 are clamped from below against the outwardly bent free ends 21 of the U-shaped support rail 20, and the lower part 15 of the base body 12 rests from above on the outwardly bent free ends 21 of the U-shaped support rail 20 such that the free ends 21 of the U-shaped support rail 20 are each clamped in between one terminal block 18 and the lower part 15 of the base body 12. A housing 19, shown here in sectional form, is arranged around the base body 12 and the terminal blocks 18 and almost fully encloses the base body 12, the screws 16a, 16b screwed into it and the terminal blocks 18 thus forming the outer contour of the fastening element 10 in the embodiment shown here. Openings 22 are provided in the housing 19 in the region of the screws 16a, 16b and the through-opening 17 formed in the base body 12 such that the screws 16a, 16b and the connecting element 13 can be turned using a tool via the openings 22. The connecting element 13 is also constructed in the form of a self-tapping screw in this embodiment, it being shown in the case of the embodiment shown in FIG. 3 how the connecting element 13 is fed through the support rail 20 and a mounting base 40, in the form of a mounting plate here, in order to fasten the support rail 20 to the mounting base 40.

Figure 4:
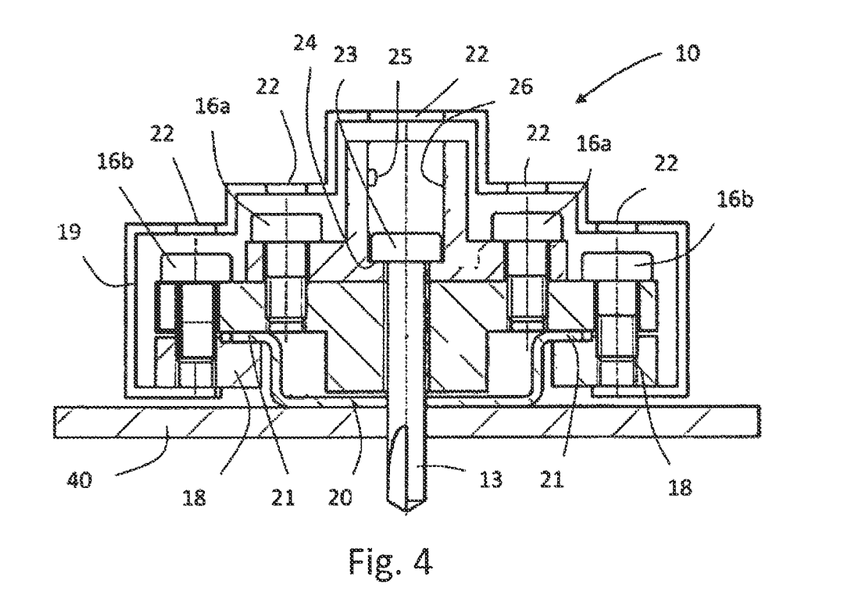
FIG. 4 shows a schematic sectional view of the fastening element shown in FIG. 3.

FIG. 4 shows a sectional view through the fastening element 10 shown in FIG. 3. It can be seen here that the through-opening 17 has a shoulder 24 formed as a locating surface for an upper part 23, in particular a screw head, of the connecting element 17. The shoulder 24 is formed here in the upper part 14 of the base body 12. As a result of the shoulder 24 formed in the through-opening 17, by which a step is formed in the through-opening 17, the through-opening 17 has two different diameters, the diameter of the through-opening 17 being greater above the shoulder 24 than below the shoulder 24. As a result of the shoulder 24 formed as a locating surface, the connecting element 13 can be limited in its vertical movement downwards towards the support rail 20 in that the upper part 23 of the connecting element 13 comes to rest on the shoulder 24. An additional limitation of the upwards vertical movement of the connecting element 13 guided in the through-opening 17 is formed by a retainer 25, which is constructed in the form of a protrusion formed on the inner wall 26 of the through-opening 17 above the shoulder 24 in the embodiment shown here. The connecting element 13 can thus be prevented from slipping upwards out of the through-opening 17, in particular during transportation of the fastening element 10. The upper part 23 of the connecting element 13 is thus guided and movable between the shoulder 24 and the retainer 25.

Figure 5:
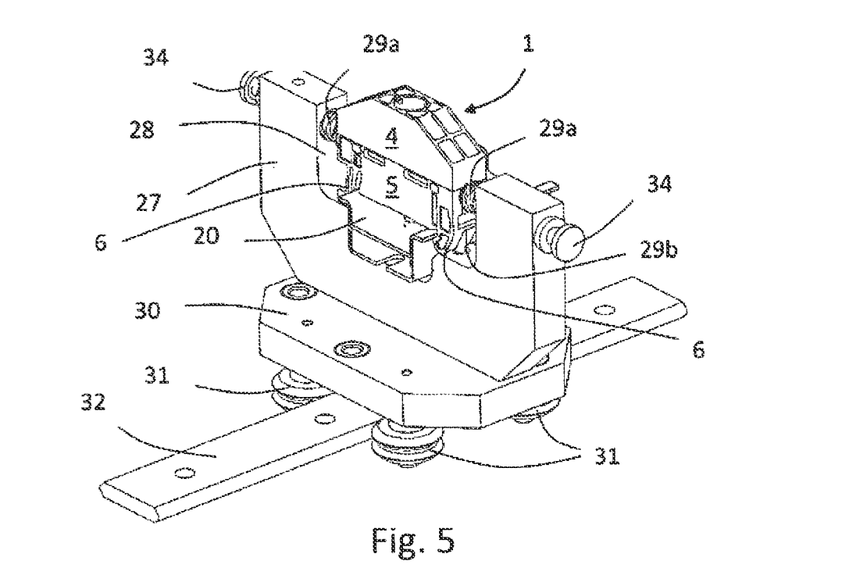
FIG. 5 shows a schematic view of fastening element as shown in FIG. 1 arranged in a clamping frame of a support system according to an embodiment of the invention.
Figure 6:
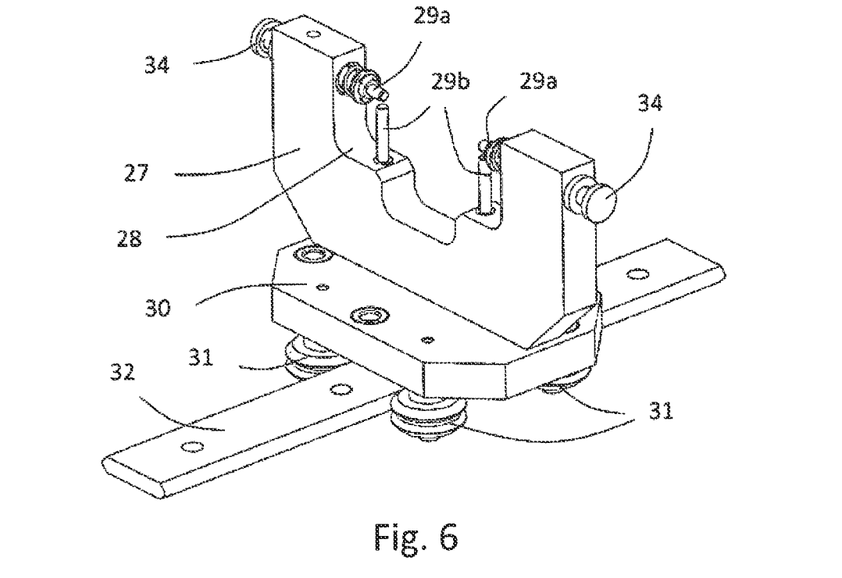
FIG. 6 shows a schematic view of a clamping frame without a fastening element arranged therein according to an embodiment of the invention.

In FIG. 5 the block-type fastening element 1 shown in FIG. 1 is mounted in a clamping frame 27 of a support system. It is, of course, also possible to mount the fastening element 10 shown in FIG. 3 or another kind of block-type fastening element in a clamping frame 27 formed in such a way. The clamping frame 27 is substantially U-shaped. The fastening element 1 is inserted into the clamping frame 27 from above such that the fastening element 1 is clasped or gripped by the clamping frame 27 from below. The fastening element 1 is mounted here in the clamping frame 27 together with a support rail 20, on which the fastening element 1 is fastened, in that the fastening element 1 is placed on the top surface of the support rail 20. Retaining pins 29a, 29b are formed on the inner surface 28 of the clamping frame 27, as can be seen in particular in FIG. 6, and can engage in recesses formed in the base body 2 and the mounting foot 6 of the fastening element 1. In the process, two retaining pins 29b engage in the mounting foot 6 from below and two retaining pins 29a engage laterally in the base body 2, in particular the lower part 6 of the base body 2. The retaining pins 29a, which engage laterally, are each arranged on a spring-loaded bolt 34 shown here and can be stopped by said bolt such that a secure clamping of the fastening element 1 in the clamping frame 27 can be guaranteed. The clamping frame 27 is arranged on a plate-shaped foot element 30. Four roller bearings 31 are arranged on the underneath of the foot element 30 and laterally grip onto a guide rail 32 arranged beneath the foot element 30, thus facilitating a guiding of the foot element 30 and thus the clamping frame 27 together with the fastening element 1 clamped into it and the support rail 20 fixed onto it along the guide rail 32. In FIG. 6 the clamping frame 27 is shown again without a fastening element inserted into it.

As an alternative to the retaining pins 29a, 29b and the spring-loaded bolt 34, the fastening element 1 can also be mounted in the clamping frame 27 using suction devices, not shown here, or a magnetic effect, not shown here.

FIG. 7 shows a support system for transporting and/or retaining a support rail 20, for example while electrical components 33, such as modular terminal blocks, are being mounted on the support rail 20 and also while the electrical components 33 fastened to the support rail 20 are being finished. In the case of mounting the electrical components 33 on the support rail 20, this is carried out before the support rail 20 is fastened to a mounting base 40 such as one shown in FIG. 3.

Figure 9:
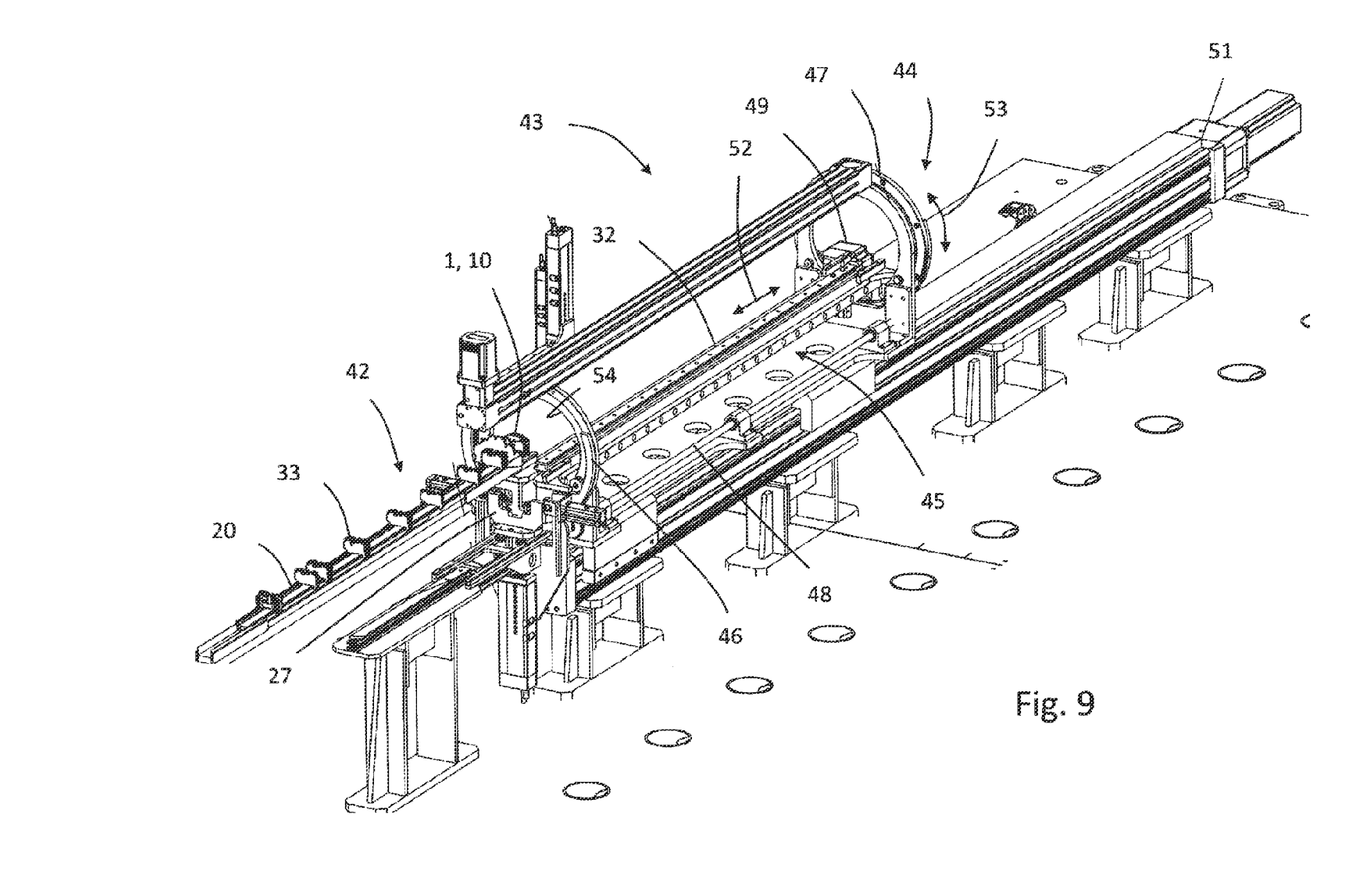
FIG. 9 shows a schematic view of a third embodiment of a support system according to an embodiment of the invention.

In order to construct the support system, a certain number of fastening elements 1, depending on the length of the support rail 20, are first fastened to the support rail 20. In the embodiment shown here, three fastening elements 1 are arranged on the support rail 20. The support rail 20 with the fastening elements 1 arranged thereon is then transported to a support system where, in a mounting station of the support system, as also shown in FIG. 9, the fastening elements 1 are each first inserted and clamped into a clamping frame 27, which is guided on the guide rail 32. After the support rail 20 has been fixed in the clamping frame 27 of the support system using the fastening elements 1, electrical components can, for example, be mounted on the support rail 20. The electrical components 33 can, however, also be mounted on the support rail 20 before the arrangement of the clamping frames 27 on the fastening elements 1, 10, as shown in FIG. 9. As a result of guiding the clamping frames 27 along the guide rail 32, potential torsions and bending of the support rail 20 can be evened out. Moreover, the support rail 20 is in a constrained clamped position due to the fastening elements 1 and the clamping frames 27 both transverse to the longitudinal axis of the support rail 20 and vertically to the longitudinal axis of the support rail 20, as a result of which potential torsions and bending of the support rail 20 can likewise be evened out. Since the distance between the clamping frames 27 on the guide rail 32 is variable within certain limits, torsions and bending of the support rail 20 can likewise be evened out. Using the mounting system according to the invention, it is therefore possible to transport and/or to position the support rail 20 mounted using the fastening elements 1 in a longitudinal direction along the longitudinal axis of the support rail 20 in an accurately reproducible manner without incurring a loss of accuracy in other extension directions in the process such that components can be mounted on the support rail 20, for example, in a fully automated manner.

Figure 8:
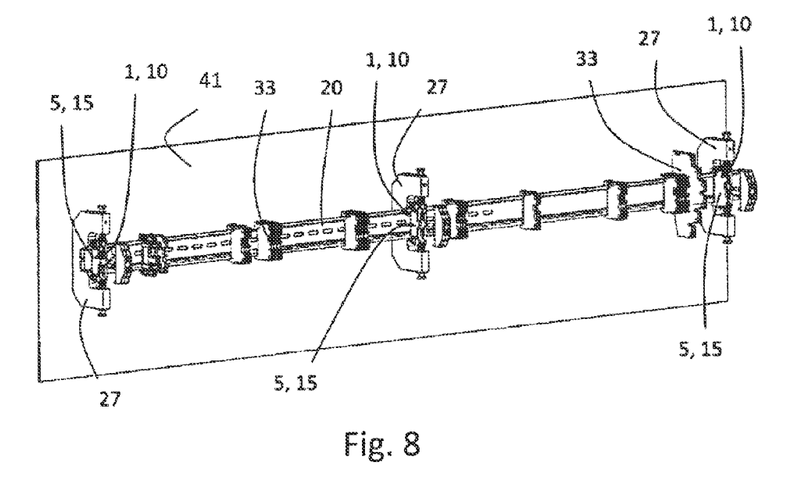
FIG. 8 shows a schematic view of a second embodiment of a support system according to an embodiment of the invention.

Alternatively, the support system can also be used in a control cabinet, as shown in FIG. 8, in order to fix a support rail 20 in the control cabinet using one or more fastening elements 1, 10 and one or more clamping frames 27 without cutting. In the process, the clamping frames 27 are fastened directly to a wall 41 of the control cabinet or a mounting base arranged inside the control cabinet. The fastening elements 1, 10 together with the support rail 20 with the electrical components 33 mounted thereon, on which the fastening elements 1, 10 are placed, are then inserted and mounted into the clamping frames 27 fastened to the wall 41. As shown in FIG. 8, in such a use of the support system it can be provided for only the lower part 5, 15 of the fastening element 1, 10 to be used. The upper part 4, on which the connecting element 3, 13 is also fastened, can then be omitted.

Figure 10:
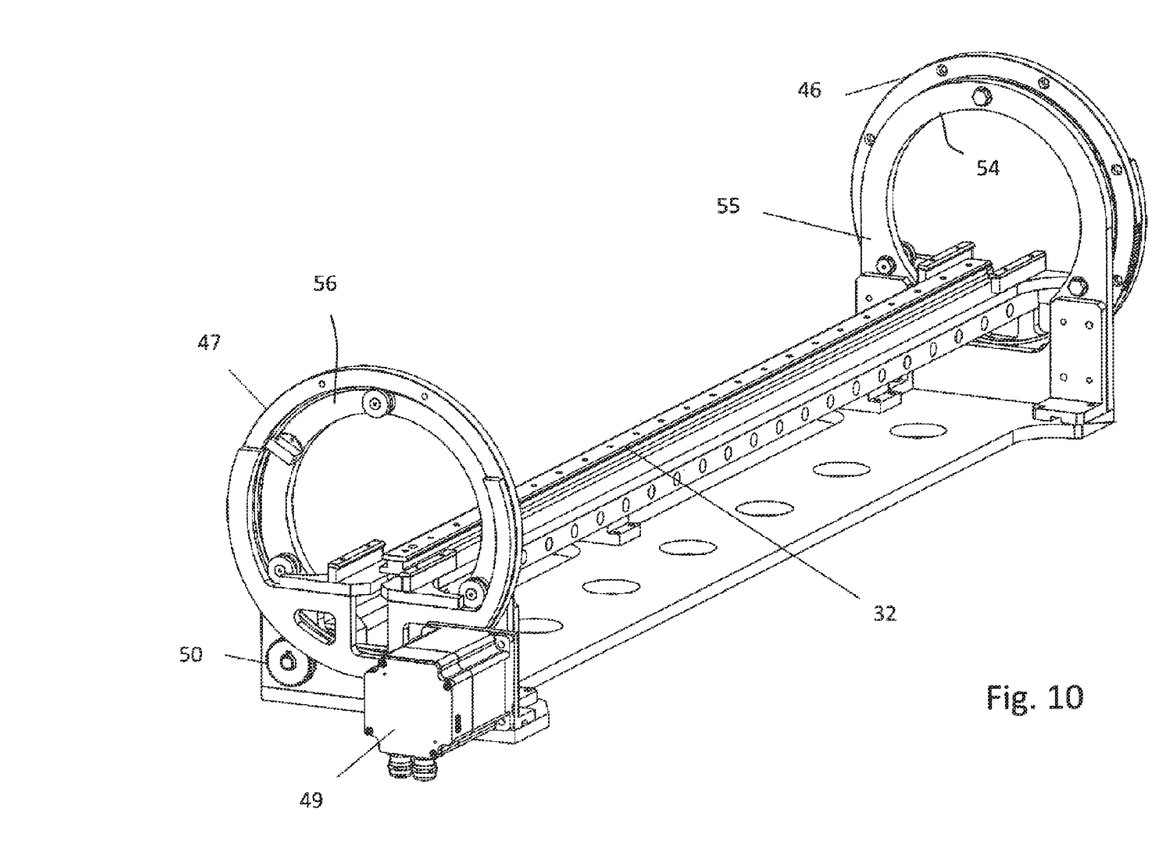
FIG. 10 shows a detailed view of a linear pivot system of the support system shown in FIG. 9.

In FIGS. 9 and 10, another possible embodiment of a support system according to the invention is shown having a mounting station 42, in which a clamping frame 27 of the support system is arranged and braced on a fastening element 1, 10 arranged on a support rail 20. Furthermore, the support system shown here has a linear pivot system 43 arranged directly after the mounting station 42.

A support rail 20, on which electrical components 33 have previously been mounted in a processing station, not shown here, is transported into the mounting station 42 and is held in the mounting station 42 in a defined position. The support rail 20 can, for example, be held by means of a cylinder combination, which has a stop element and is guided vertically to the longitudinal axis of the support rail 20, it being possible for the stop element to be lowered from above the support rail 20 towards the support rail 20, for example, until the fastening element 1 or 10 or electrical component 33 arranged first in the direction of the movement of the support rail 20 is moved against the stop element and thus the movement of the guide rail 20 towards its longitudinal axis is interrupted or stopped.

If the support rail 30 is held or stopped in the processing station 42, a clamping frame 27, which has been provided beforehand underneath the support rail 20, is moved upwards towards the support rail 20 as far as the fastening element 1, 10 arranged on the support rail 20 such that the clamping frame 27 can grip around the fastening element 1, 10 from underneath the support rail 20 and thus be fastened to the fastening element 1, 10. During the movement of the clamping frame 27 towards the support rail 20 and the fastening element 1, 10, the spring-loaded bolts 34 of the clamping frame 27 are opened in order to be able to engage in the fastening element 1, 10. The spring-loaded bolts 34 can be opened, for example, using cylinders, which have a piston rod driven by a motion link.

Subsequent to the mounting of the clamping frame 27 to the fastening element 1, 10, the support rail 20 is inserted together with the clamping frame 27 into the linear pivot system 43. The support rail 20 can, for example, be inserted into the linear pivot system 43 using a pin mounted on an air cylinder, which engages in the clamping frame 27. As soon as the pin engages in the clamping frame 27, the pin can then be moved, for example by a horizontally operating cylinder, towards the linear pivot system 43 until the support rail 20 together with the clamping frame 27, which was mounted beforehand, is located in a defined position inside the linear pivot system 43, the support rail 20 preferably not yet being inserted fully, i.e. along its full length, into the linear pivot system 43 here. The stop element of the mounting station 42 here can again move in front of a fastening element 1, 10, which has been arranged after it on the support rail 20, such that additional clamping frames 27 can be mounted on additional fastening elements 1, 10 arranged on the support rail 20.

The linear pivot system 43 has a pivot device 44, with which the support rail 20 inserted into the linear pivot system can be pivoted or rotated, and a linear feed 45, with which the support rail 20 can be moved in a linear manner along its longitudinal axis. The pivot device 44 is shown enlarged again in FIG. 10.

The embodiment of a pivot device 44 shown in FIGS. 9 and 10 is formed as a system having a virtual center of rotation, the centre of rotation extending in the support rail, along the longitudinal axis of the support rail 20 or through the centre of the electrical components 33 arranged on the support rail 20. The virtual centre of rotation is achieved using two turntables 46, 47 arranged at a distance from each other, between which a guide rail 32, in which the clamping frames 27 engage, is arranged. The guide rail 32 is firmly connected to the two turntables 46, 47. The guide rail 32 and thus the support rail 20 arranged thereon can be pivoted to any required angle by means of the turntables 46, 47. To form the pivotal movement the turntables have a drive, which in turn comprises a synchronous shaft 48, which is arranged between the two turntables 46, 47, and a stepped motor drive 49. The synchronous shaft 48 has a synchronous sprocket 50 at each of its two ends, which each engage in one of the two turntables 46, 47 respectively. When inserting the support rail 20 into the linear pivot system 43, the support rail 20 is fed through the opening 54 formed in the turntable 46. The turntables 46, 47 are each mounted on a disc-shaped receiving element 55, 56, on which the guide rail 32 is also held. The linear feed 45 is formed by the guide rail 32, on which the support rail 20 can be moved in a linear manner along its longitudinal axis.

The linear pivot system 43 is mounted on a linear guide axle 51, which facilitates the variable feed of the whole linear pivot system 43.

When all the work on the support rail 20 has been completed, such as finishing the electrical components 33 by affixing marking labels, for example, the support rail 20 is moved back out again by means of the turntable 46 via which the support rail 20 had been moved into the linear pivot system 43. The movement of the support rail 20 while being moved in and out of the linear pivot system 43 is indicated by the arrow 52.

The rotational movement of the pivot device 44 is indicated by the arrow 53.

As an alternative to the system shown in FIGS. 9 and 10 having a virtual centre of rotation, a system having a real centre of rotation, not shown here, is also possible. In such a system a rotatable device, such as a shaft, is fixed underneath the support rail 20. If the rotatable device is rotated, the support rail 20 also rotates such that the centre of rotation here is formed underneath the support rail 20.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

Fastening element 1, 10
Base housing 2, 12
Connecting element 3, 13
Upper surface 4, 14
Underneath 5, 15
Mounting foot 6
Through-opening 7, 17
Plate spring 8
Screw 16a, 16b
Terminal block 18
Housing 19
Support rail 20
Free end 21
Opening 22
Upper part 23
Shoulder 24
Retainer 25
Inner wall 26
Clamping body 27
Inner surface 28
Retaining pin 29a, 29b
Foot element 30
Roller bearing 31
Guide rail 32
Electrical component 33
Spring-loaded bolt 34
Mounting base 40
Wall 41
Mounting station 42
Linear pivot system 43
Pivot device 44
Linear feed 45
Turntable 46, 47
Synchronous shaft 48
Stepper motor drive 49
Synchronous sprocket 50
Linear feed axle 51
Arrow 52
Arrow 53
Opening 54
Receiving element 55, 56

The invention claimed is:

1. A support system for a support rail, the support system comprising:
at least one clamping frame; and
at least one block-type fastening element configured to be disposed on and fastened to a top surface of the support rail, the at least one fastening element being mounted in the at least one clamping frame,
wherein the clamping frame is guided movably on a guide rail.

2. The support system recited in claim 1, wherein the clamping frame is substantially U-shaped and the clamping frame grips around the fastening element mounted in the clamping frame underneath the support rail.

3. The support system recited in claim 2, wherein the fastening element has a base body fastenable to the support rail via a connecting element, the connecting element being disposed in a through-opening of the base body.

4. The support system recited in claim 3 further comprising a linear pivot system with a pivot device configured to pivot the support rail and a linear feed that is adapted to guide the support rail linearly.

5. The support system recited in claim 1, wherein the fastening element has a base body fastenable to the support rail via a connecting element, the connecting element being disposed in a through-opening of the base body.

6. The support system recited in claim 1 further comprising a linear pivot system with a pivot device configured to pivot the support rail and a linear feed that is adapted to guide the support rail linearly.

7. The support system recited in claim 6, wherein the clamping frame is guided movably on a guide rail and the pivot device includes two turntables disposed opposite one another, the guide rail being disposed between the two turntables and connected to the two turntables.

8. The support system recited in claim 7, wherein the linear pivot system is mounted on a linear guide axle.

9. The support system recited in claim 7, wherein the two turntables include a drive for executing a pivotal movement, the drive comprising a synchronous shaft and a stepper motor drive.

10. The support system recited in claim 9, wherein the linear pivot system is mounted on a linear guide axle.

11. The support system recited in claim 6, wherein the linear pivot system is mounted on a linear guide axle.

* * * * *